United States Patent
Boulmakoul et al.

(10) Patent No.: US 7,028,047 B2
(45) Date of Patent: Apr. 11, 2006

(54) APPARATUS AND METHODS FOR GENERATING A CONTRACT

(75) Inventors: Abdel Boulmakoul, Bristol (GB); Adrian Baldwin, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 457 days.

(21) Appl. No.: 10/251,001

(22) Filed: Sep. 20, 2002

(65) Prior Publication Data

US 2003/0074633 A1    Apr. 17, 2003

(30) Foreign Application Priority Data

Sep. 21, 2001   (GB)  .................................. 0122889

(51) Int. Cl.
    *G06F 7/00*    (2006.01)
(52) U.S. Cl. .......................................... 707/102; 705/29
(58) Field of Classification Search ............. 707/104.1, 707/102; 705/29
    See application file for complete search history.

(56) References Cited

U.S. PATENT DOCUMENTS

| 5,272,623 | A | | 12/1993 | Grubb et al. | |
|---|---|---|---|---|---|
| 5,446,653 | A | * | 8/1995 | Miller et al. | 705/4 |
| 5,692,206 | A | * | 11/1997 | Shirley et al. | 715/531 |
| 6,067,531 | A | * | 5/2000 | Hoyt et al. | 705/35 |
| 2002/0091539 | A1 | * | 7/2002 | Yin et al. | 705/1 |
| 2002/0091579 | A1 | * | 7/2002 | Yehia et al. | 705/26 |
| 2002/0129056 | A1 | * | 9/2002 | Conant et al. | 707/511 |

FOREIGN PATENT DOCUMENTS

| GB | 2264797 A | 9/1993 |
|---|---|---|
| WO | WO01/04772 A2 | 1/2001 |

* cited by examiner

*Primary Examiner*—Wayne Amsbury
(74) *Attorney, Agent, or Firm*—Thomas, Kayden, Horstemeyer & Risley, LLP

(57) ABSTRACT

International business requires contractual relations to be established across jurisdictions. Different jurisdictions have different laws, customs, languages and obligations concerning contractual relations. Thus a standard contract can rarely be used across different jurisdictions. Using a contract template and processing this with a mapping database using a conversion engine, enables substantially automated localisation of a contract template to be achieved. This significantly reduces the cost and effort to enter a new market.

19 Claims, 3 Drawing Sheets

APPARATUS AND METHODS FOR GENERATING A CONTRACT

FIELD OF THE INVENTION

This invention relates to a method of automatically generating a contract, contract generating apparatus and to contract template databases and mapping databases for use with the method and apparatus.

BACKGROUND OF THE INVENTION

Business is increasingly being conducted across national borders. This means that contractual arrangements must be made between parties having different laws, customs and languages concerning such arrangements. Therefore, in order to safely conduct such international business, it is necessary to ensure that suitable contract documents are used between parties which include clauses in the correct languages and clauses dealing with the peculiarities of a state's laws.

Thus, entry into a new market incurs significant costs not only resulting from the normally anticipated marketing, distribution and manufacturing costs but also costs associated with establishing contractual relations with parties in the new territory such as importers, wholesalers and distributors. There is therefore a desire to have the ability to choose a particular contract suitable for a product and have contracts created which have equivalent effect to that "template" contract" in any desired state. Hitherto, it has been necessary to employ expensive experts to produce such equivalent documents.

SUMMARY OF THE INVENTION

In accordance with a first aspect of the invention, there is provided a method of automatically generating a contract comprising receiving a contract type indicator indicative of the desired type of the contract document, a contract template database containing a plurality of clause records, each representative of a clause which is to be present in the contract, a mapping database containing a plurality of mapping records, each storing a mapping between a clause record and one or more final contract clauses, each final contract clause being indexable by the type indicator and a clause record processing the contract template database using a conversion engine which is operable to generate the contract document by selecting final contract clauses from the mapping database based on the mapping records and the type indicator, and amalgamating the final contract clauses to form the contract.

Typically the contract type indicator will be an indication of the country for which the template should be "localised" by the conversion engine. Optionally, the contract template may include variable fields which may be instantiated by user input prior to processing. These variable fields may for example be money value figures for example in a sales contract or licence. The instantiated variable may be passed into the final contract unchanged or may, for example, be converted into a representative value such as an equivalent money value in a local currency.

The conversion engine preferably operates to check for particular combinations of clauses which are known to require special treatment. For example, particular combinations of clauses may be contradictory (in which case a resolution is sought via user input, preferably) or certain combinations may require the inclusion of additional clauses which were not indicated in the template contract. Any ambiguity in these decisions may be resolved by seeking user input.

Further instances in which user input may be required are those in which a choice of contract clauses are available from the mapping template and a situation in which no mapping record is available in the mapping database for a particular clause record as defined by the type indicator.

In accordance with a second aspect of the invention, there is provided a contract generator comprising a type input for receiving a contract type indicator indicative of the desired type of the contract, a template input for receiving a contract template database containing a plurality of clause records each representative of a clause which is to be present in the contract document, a mapping input for receiving a mapping database containing a plurality of mapping records each storing a mapping between a clause record and one or more final contract clauses, each final contract clause being indexable by the type indicator and a clause record, a conversion engine arranged to process the contract template database to generate the contract document by selecting final contract clauses from the mapping database based on the mapping records and the type indicator, and a contract output arranged to output the amalgamated final contract clauses to form the contract.

The invention also provides a computer readable medium carrying program steps, which when executed by a computer, cause the computer to carry out the method aspect above.

The invention may provide a contract template database for the method and apparatus aspects above, containing a plurality of clause records each representative of a clause which is to be present in the said contract.

The invention may provide a mapping database for the method and apparatus aspects above, containing a plurality of mapping records each storing a mapping between a clause record and one or more final contract clauses, each final contract clause being indexable by the type indicator and a clause record.

Other aspects and features of the present invention will become apparent to those ordinarily skilled in the art upon review of the following description of the specific embodiments of the invention in conjunction with the accompanying figures.

DETAILED DESCRIPTION OF THE INVENTION

Figure 1:
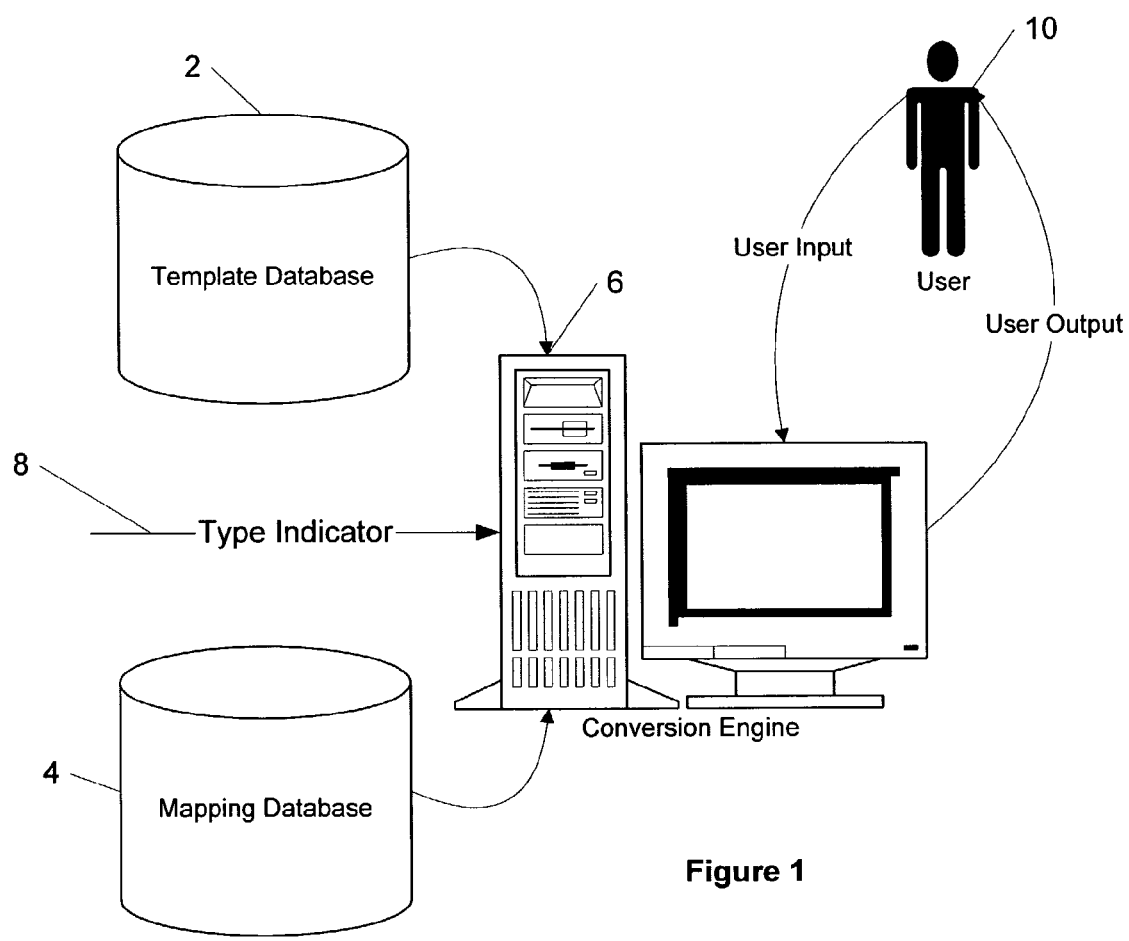
FIG. 1 is a schematic block diagram of apparatus in accordance with the invention.

With reference to FIG. 1, a template contract is stored in a template database 2. The template database stores a plurality of clause records each of which relate to a potential clause in a final contract document. The template database stores at least one template contract in the form of linked clause records.

Figure 3:
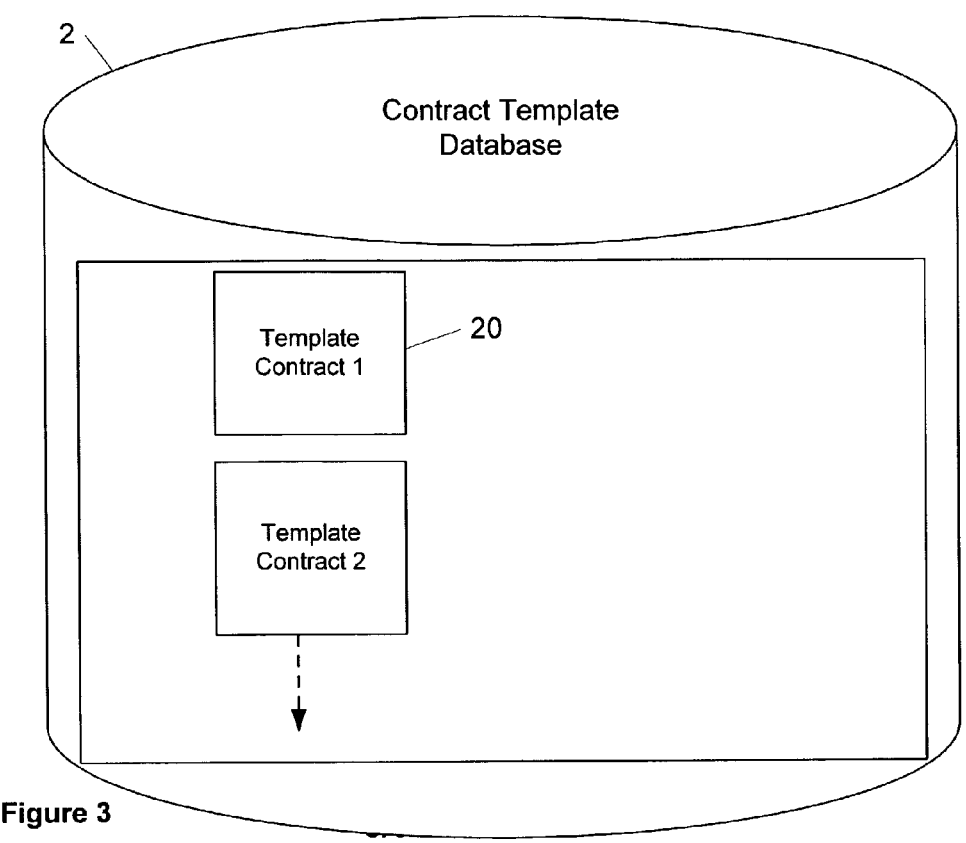
FIG. 3 is a schematic block diagram of a contract template database in accordance with the invention.

Thus with reference to FIG. 3, a single contract (for example "contract 1") is stored in the template database in the form of a contract record 20 which itself links together a set of clause records.

A contract template is created typically by an expert user who would normally be writing the final localised contracts.

With reference again to FIG. 1, a mapping database 4 contains mapping records which map the clause records from a template database 2 to real clauses in the final output contract. The mapping is carried out by a conversion engine 6 and with reference to a type indicator 8 which is input by a user 10.

The type indicator 8 is used, for example to indicate a country for which the final output contract is to be "localised".

Figure 4:
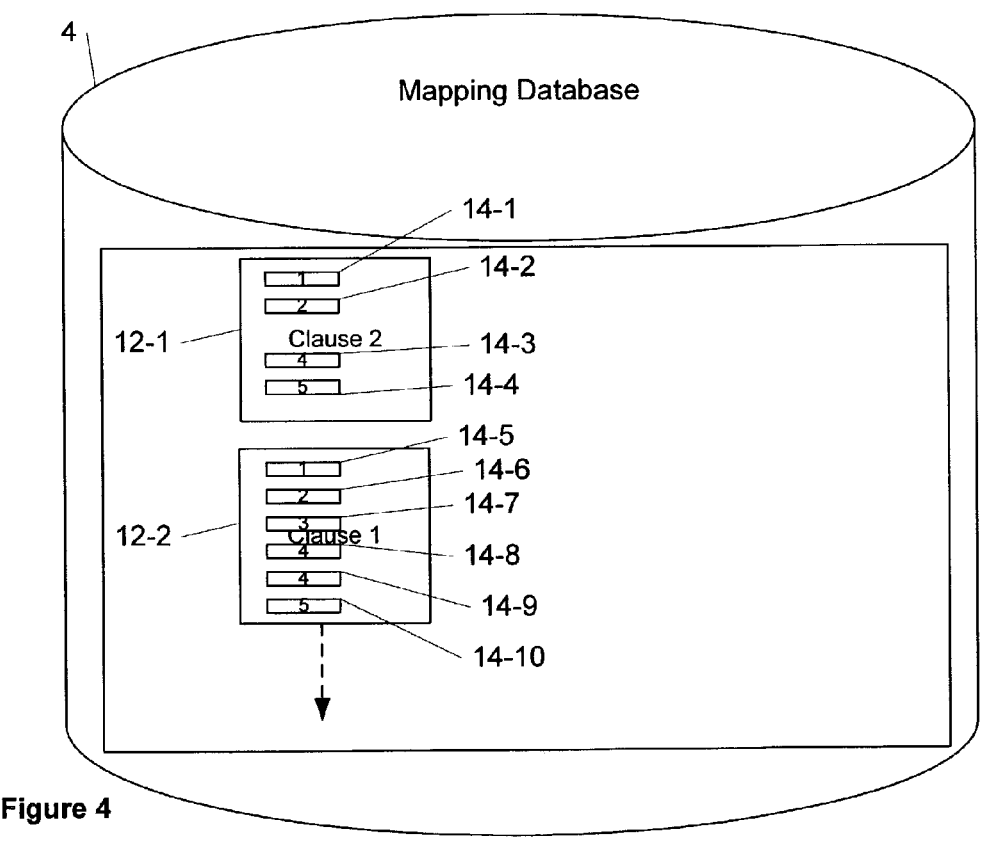
FIG. 4 is a schematic block diagram of a mapping database in accordance with the invention.

Thus with reference to FIG. 4, the mapping database 4 contains a plurality of mapping records 12-1 and 12-2 each of which contains one or more final clause 14-1 to 14-10. The type indicator 8 is used to point to the appropriate final clause in a mapping record.

Thus, in FIG. 4, the final clauses have been numbered from 1 to 5. For the sake of explanation, let us assume that the type indicator can take any number from 1 to 5; each number representing a different country for localisation. Thus, if the type indicator were set to country 1, and clauses 1 and 2 were present then the final clauses which would be selected by the mapping database would be those referenced 14-1 and 14-5 in FIG. 4.

It will be noted in FIG. 4 that the clause 1 mapping record contains two final clauses for type indicator 4 namely final clauses 14-8 and 14-9. If the type indicator is set to 4, in this instance, the conversion engine 6 seeks user input during conversion of the contract template into a final contract in order to determine which of the choice of final clauses 14-8 and 14-9 should be included in the final contract. Similarly, it will be noted that in clause 2, there is no final clause for a contract sought to be localised for country 3. In this instance, the lack of a suitable clause will be flagged to the user using user output.

Additionally, the conversion engine may look for particular combinations of clauses in the contract template and may automatically insert suitable additional clauses depending on the type indicator. It may also insert predetermined clauses in the final contract depending simply on the type indicator. Thus, for example if there are certain clauses required in a particular country for example limiting liability for certain actions, then these can automatically be inserted when the type indicator indicates that the contract is to be used in that country.

Figure 2:
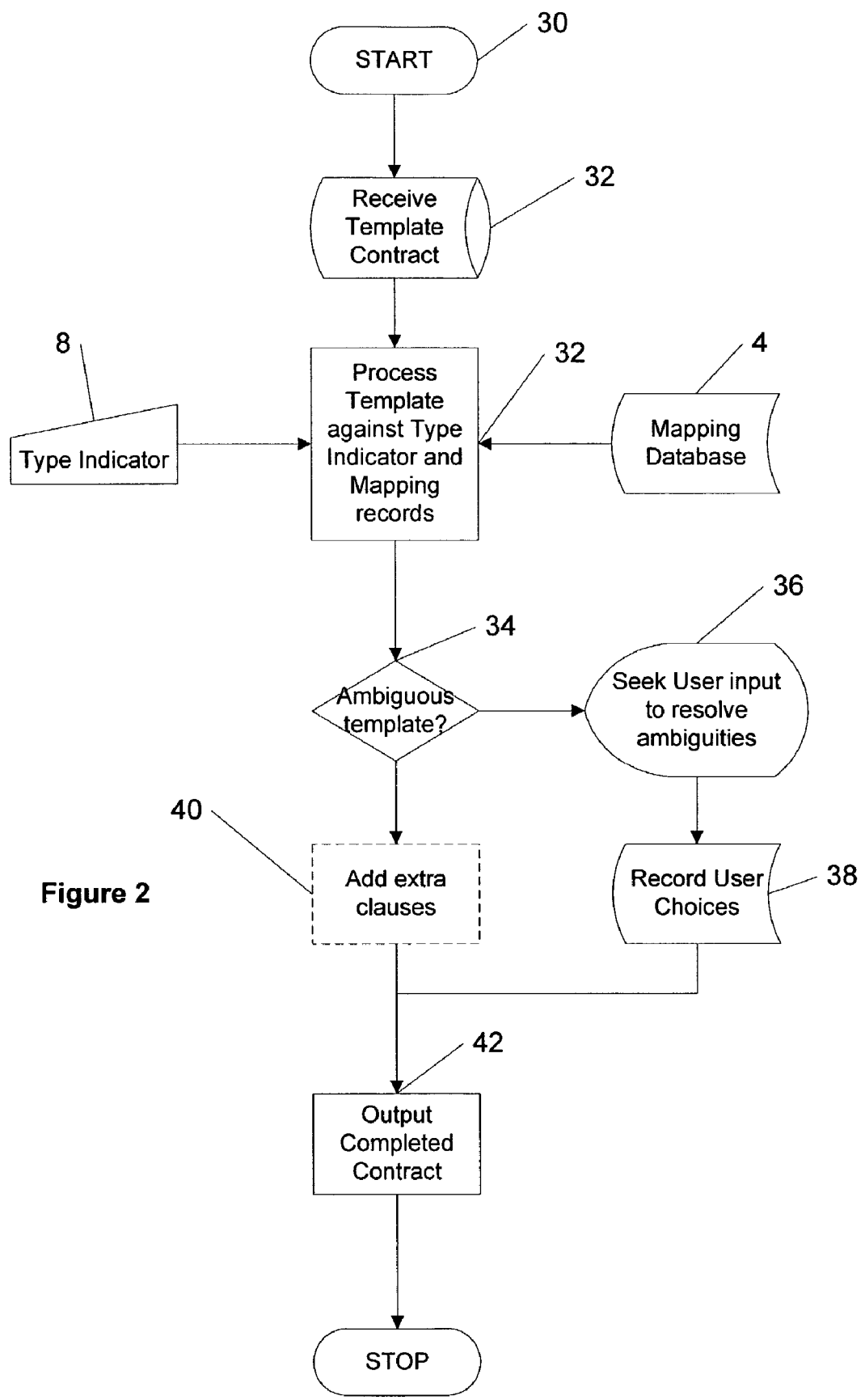
FIG. 2 is a flow chart showing processing of a template contract to produce an output completed contract.

With reference to FIG. 2, the steps carried out by the apparatus of FIG. 1 are as follows.

The conversion engine receives a template contract (step 30) and then proceeds to process the template against the type indicator 8 and the mapping records in the mapping database 4 (step 32).

During processing, the template, in combination with the type indicator, is checked for ambiguity (step 34). If ambiguities are found then user input is sought (step 36) and user choices are recorded (step 38).

User choices are recorded in order that minor changes to the contract template in order to produce an amended contract, may be processed by the conversion engine with reduced interaction with the user; since previous choices may be applied to the new (amended) contract. Preferably also, when user input is sought, explanations are provided to guide the user to an appropriate choice.

Alternatively, the previous user choices may be used to guide a user about subsequent choices for an amended contract.

The conversion engine also may analyse the template contract in relation to the type indicator and add additional clauses where particular combinations of clauses are found or where a type indicator indicates that additional "boiler plate" clauses are required in that particular country or locale.

Once these steps have been completed, the final clauses are amalgamated into an output completed contract (step 42).

What is claimed is:

1. A method of automatically generating a contract comprising:
   receiving electronically a contract type indicator indicative of a desired type of contract document,
   receiving electronically a contract template formed as a plurality of clause records, each clause record representative of a type of clause which is to be present in the contract document,
   receiving electronically a plurality of mapping records, each mapping record containing one or more final contract clauses for a clause record contained in the contract template, each clause record mapping to a mapping record, wherein at least one mapping record contains a plurality of final contract clauses, the plurality of final contract clauses including variations of clauses of the same type, and
   automatically generating electronically a contract document from the contract template by selecting final contract clauses based on mapping records and the type indicator, wherein each final contract clause within a mapping record is indexable by the type indicator.

2. The method according to claim 1, wherein the contract template includes a variable field and wherein the method includes seeking user input to instantiate the variable field prior to generating the contract document.

3. The method according to claim 2, wherein a value representative of the instantiated variable field is maintained in the contract document.

4. The method according to claim 1, including checking the contract template for a combination of a predetermined plurality of contract clause records and in dependence on the combination, automatically proposing an additional clause record for the contract template.

5. The method according to claim 1, including automatically proposing an additional clause record for the contract template in dependence on the type indicator.

6. The method according to claim 1, including seeking user input to resolve an ambiguity, wherein the ambiguity includes at least one of a mapping record providing a choice of clause records for the type indicator, conflicting clause records, and the lack of a mapping record for a clause record, during processing of the contract template.

7. The method according to claim 6, including recording user choices made during the user input, for subsequent re-use.

8. The method according to claim 1, including providing user output during processing of the contract template.

9. The method of claim 1, wherein the contract type indicator identifies a geographical region, such that the selected final contract clauses comply with laws and customs of the geographical region.

10. The method of claim 1, further comprising the step of: automatically inserting suitable additional clauses depending on the type indicator.

11. The method of claim 10, wherein the type indicator indicates a legal jurisdiction where the contract document is to be applied.

12. A contract generator comprising:
- a type input for receiving electronically a contract type indicator indicative of a desired type of a contract,
- a template input for receiving electronically a contract template in the form of a plurality of clause records, each clause record representative of a clause which is to be present in the contract,
- a mapping database containing a plurality of mapping records, each storing a mapping between a clause record and one or more final contract clauses, each final contract clause being indexable by the type indicator and a clause record, wherein at least one mapping record contains a plurality of final contract clauses, the plurality of final contract clauses including variations of clauses of the same type,
- a conversion engine arranged to process the contract template to automatically generate electronically the contract document by selecting final contract clauses from the mapping database based on the mapping records and the type indicator, and
- a contract output arranged to output the amalgamated final contract clauses to form the contract.

13. The system of claim 12, wherein the contract type indicator identifies a geographical region, such that the selected final contract clauses comply with laws and customs of the geographical region.

14. The system of claim 12, the conversion engine further arranged to automatically insert suitable additional clauses depending on the type indicator.

15. The system of claim 14, wherein the type indicator indicates a legal jurisdiction where the contract document is to be applied.

16. A computer readable medium carrying program steps which when executed by a computer, cause the computer to automatically generate a contract by:
- receiving electronically a contract type indicator indicative of a desired type of contract document,
- receiving electronically a contract template formed as a plurality of clause records, each clause record representative of a type of clause which is to be present in the contract document,
- receiving electronically a plurality of mapping records, each mapping record containing one or more final contract clauses for a clause record contained in the contract template clause record mapping to a mapping record, wherein at least one mapping record contains a plurality of final contract clauses, the plurality of final contract clauses including variations of clauses of the same type, and
- automatically generating electronically a contract document from the contract template by selecting final contract clauses based on mapping records and the type indicator, wherein each final contract clause within a mapping record is indexable by the type indicator.

17. The medium of claim 16, wherein the contract type indicator identifies a geographical region, such that the selected final contract clauses comply with laws and customs of the geographical region.

18. The medium of claim 16, further comprising the step of:
- automatically inserting suitable additional clauses depending on the type indicator.

19. The medium of claim 18, wherein the type indicator indicates a legal jurisdiction where the contract document is to be applied.

* * * * *